Patented Dec. 2, 1952

2,620,364

UNITED STATES PATENT OFFICE 2,620,364

POLYMERIZATION OF OLEFINS WITH A BORON PHOSPHATE CATALYST

Robert C. Krug, Yeadon, Pa., assignor to The Atlantic Refining Company, Philadelphia, Pa., a corporation of Pennsylvania No Drawing. Application April 14, 1948, Serial No. 21,085

9 Claims. (Cl. 260—683.15)

The present invention relates to the polymerization of olefins, and particularly aliphatic mono-olefins, in the presence of a catalyst comprising boron phosphate.

In accordance with this invention, aliphatic mono-olefins containing from 3 to 10 carbon atoms are contacted with a boron phosphate catalyst at temperatures between 150° F. and 600° F. under pressures between 0 and 1000 pounds per square inch gage at space velocities between 0.5 and 3 volumes of olefin per volume of catalyst per hour to yield olefin polymers of substantially higher molecular weight than the original mono-olefins. The character of the polymers is dependent, of course, upon the mono-olefin charge and the conditions under which polymerization is effected. For example, propylene may be polymerized at 300° F. to 600° F. under pressures between 300 and 700 pounds per square inch gage, and preferably at 400° F. and 650 pounds per square inch pressure to give high yields of polymers (70% to 95% conversion). At low space velocities, i. e., 0.5, substantial quantities of trimers, tetramers, and higher polymers are obtained, whereas at high space velocities, i. e., 2.5 to 3, the amount of dimers and trimers increases. At temperatures of 500° F. and higher, deposition of carbon on the catalyst occurs, and at temperatures above 600° F. depolymerization as well as substantial decomposition becomes apparent. Isobutylene may be polymerized at temperatures between 150° F. and 400° F. under pressures between 0 and 1000 pounds per square inch gage, and preferably at about 300° F. and 200 pounds per square inch pressure to give high yields (up to 100% conversion) of polymers comprising mainly di-isobutylene and minor amounts of tri- and tetraisobutylene. Polymerization of the higher mono-olefins such as the amylenes, hexylenes, etc. up to the decylenes may be readily effected at temperatures between 300° F. and 500° F. under the pressures and at space velocities specified hereinbefore. While it is preferred to employ mono-olefins in a high state of purity as polymerization charge stock, it has been found that the presence of the corresponding paraffin hydrocarbons does not prevent polymerization of the mono-olefins, although a substantial superatmospheric pressure is desirable to obtain efficient polymerization. It is, of course, possible to polymerize mixtures of two or more mono-olefins, as well as mono-olefin mixtures containing paraffin hydrocarbons. After polymerization, the polymers may be recovered from unconverted mono-olefins and by-product hydrocarbons by fractional distillation, or other suitable methods.

The catalyst employed in accordance with this invention comprises boron phosphate $BPO_4$, which may be prepared by any one of several methods, of which the following is preferred.

Chemically equivalent amounts of 85% concentration $H_3PO_4$ and crystalline boric acid or boric anhydride are mixed, and the mixture is heated at 100° C. to 150° C. for time sufficient to effect reaction, whereby $BPO_4$ is obtained as a brittle solid containing a small amount of water of hydration. Alternatively, the $BPO_4$ may be produced by reacting boric anhydride with $POCl_3$, or by reacting boron trichloride with $P_2O_5$. In any case, the $BPO_4$ is obtained as a water-insoluble solid, stable to heat, not hydrolyzed by acids, and only slowly attacked by concentrated alkali solutions. The $BPO_4$, may be crushed and screened to the desired particle size, for example, 4–14 mesh, and used as such. However, where the catalyst is to be employed in a fluidized system, the $BPO_4$ is reduced to a fine powder, for example, 200–325 mesh, and is suspended in the mono-olefin during the polymerization reaction. The $BPO_4$ may also be used in conjunction with a carrier. For example, the desired quantity of solid $BPO_4$, e. g., 10% by weight, is suspended in water with vigorous stirring to form a slurry. A second slurry is made up by suspending alumina, for example, 90% by weight, in water and the two slurries are thoroughly mixed. The aqueous suspension medium is then removed from the composite $BPO_4$-alumina, and the composite is dried, for example, at 220° F. to remove most of the free moisture. The dried catalyst consisting essentially of 10% $BPO_4$-90% alumina, is then pelleted in a conventional pelleting machine to form pellets or tablets of desired size, for example, $\frac{3}{16}$ inch cylinders about $\frac{3}{16}$ inch in length which are then ready for use in the polymerization operation. The alumina employed in preparing the composite catalyst may be derived from various sources. Alumina scale from the Bayer process, which has been activated by heating at 600° F. to 1200° F. to a moisture content of about 1.5% or less, is satisfactory for use in the preparation of the catalyst. Or, alumina obtained by reacting an aqueous solution of aluminum chloride, nitrate, or sulfate with an alkali metal hydroxide, carbonate or bicarbonate, or with ammonia, after water-washing and drying is also satisfactory for use. Finely divided naturally occurring aluminum hydrates, such as bauxite, may also be used, with or without preliminary drying or calcination. If desired, the composite $BPO_4$-alumina catalyst, after pelleting, may be heated at 600° F. to 1000° F. prior to use.

In carrying out the polymerization, a suitable tower or vessel is filled with the catalyst fragments or pellets, and the olefin to be polymerized is heated to a temperature between 150° F. and 600° F. and passed at a pressure between 0 and 1000 pounds per square inch gage through the bed of catalyst fragments or pellets contained in the tower, the space velocity being maintained between 0.5 and 3 volumes of olefin per volume of catalyst per hour. To assist in maintaining the desired catalyst temperature, the tower may be jacketed or provided with heat exchange means of conventional design. The polymers and unconverted hydrocarbon after removal from the catalyst tower, may be separated by fractionation and unpolymerized mono-olefins may be recycled for further conversion. After continuous service over a prolonged period, the polymerizing efficiency of the catalyst will decrease, and at such time as it reaches an uneconomic level, the catalyst may be regenerated by steaming, followed by burning off the deposited carbon at 800° F. to 1200° F., in the presence of air or other oxidizing gas.

The present invention may be further illustrated by the following examples, in which mono-olefins such as propylene and isobutylene were polymerized by contacting with a catalyst consisting essentially of $BPO_4$ prepared by reacting boric acid and phosphoric acid as hereinbefore described, crushing the $BPO_4$ to a fine powder and pelleting the powder into $\frac{3}{16}$ inch pellets. In Example 3, the $BPO_4$ was simply crushed and screened to 4–14 mesh fragments. The results are tabulated below.

|  | Propylene (95% purity) | | | | Isobutylene (95% purity) | |
| --- | --- | --- | --- | --- | --- | --- |
| Polymerization | 1 | 2 | 3 | 4 | 5 | 6 |
| Conditions: | | | | | | |
| Temp., °F | 405 | 500 | 500 | 600 | 160 | 290 |
| Pressure, p. s. i. g | 650 | 500 | 650 | 650 | 0 | 0 |
| Time (hours) | 2 | 2 | 2 | 2 | 6 | 4.5 |
| Charge (ml.) | 207 | 204 | 210 | 209 | 284 | 193 |
| Space Velocity | 1.05 | 1.02 | 1.05 | 1.05 | 0.48 | 0.43 |
| Catalyst | $BPO_4$ | $BPO_4$ | $BPO_4$ | $BPO_4$ | $BPO_4$ | $BPO_4$ |
| Volume (ml.) | 99 | 100 | 99.5 | 100 | 100 | 100 |
| Weight (gms.) | 92.6 | 98.9 | 81.8 | 99 | 98 | 98 |
| Polymer (gms.) | 40.7 | 70.9 | 94.7 | 88 | 54.2 | 114.7 |
| A. P. I. gravity, 60° F | 57.5 | 55.8 | 56.5 | 55.4 | 64.1 | 60.2 |
| Distillation— | | | | | | |
| I. B. P., °F | 150 | 145 | 122 | 104 | | |
| 400° F., E. P. (percent) | 86 | 72 | 77 | 69 | 100 | 75 |
| Density/20° C | 0.741 | 0.737 | 0.737 | 0.727 | 0.744 | 0.751 |
| Bromine No | 123 | 113 | 112 | 91 | | |
| Over 400° F. (percent) | 10 | 23 | 19 | 27 | 0 | 25 |
| Density/20° C | 0.823 | 0.827 | 0.826 | 0.850 | | |
| Bromine No | 82 | 71 | 73 | 64 | | |
| Conversion to Polymer | 41.4 | 73.1 | 94.7 | 88.6 | 33.5 | 100 |

In the examples above presented, boron phosphate alone was used as the polymerization catalyst. It is to be understood however, that such catalyst may also be used in conjunction with carriers or supporting agents such as activated alumina, bauxite, and other hydrated or partially hydrated metal oxides. Furthermore, if desired, the boron phosphate may comprise from 10% to 95% of the catalyst composition, and the boron phosphate with or without the carrier may be calcined at 600° F. to 1200° F. prior to use.

Further examples of the polymerization of propylene (95% purity), and mixtures of propylene and low molecular weight paraffins (53% propylene, 45% propane, and 2% butane), are given in the following table. In Examples 7, 8, 9, and 10, the $BPO_4$ catalyst was calcined at 900° F. prior to use. In Examples 10 and 11, the quantity of charge material and the space velocity was based upon the propylene content of the mixture (b).

|  | Propylene (95% Purity) | | | Propylene (53% Purity) | |
| --- | --- | --- | --- | --- | --- |
| Polymerization | 7 | 8 | 9 | 10 | 11 |
| Conditions: | | | | | |
| Temp., °F | 300 | 400 | 500 | 400 | 400 |
| Pressure, p. s. i. g | 650 | 650 | 650 | 650 | 650 |
| Time (hours) | 2 | 2 | 2 | 2 | 2 |
| Charge (ml.) | 207 | 200 | 204 | 210 (b) | 222 (b) |
| Space Veloc | 1.04 | 1.00 | 1.02 | 1.05 (b) | 1.11 (b) |
| Catalyst | $BPO_4$ | $BPO_4$ | $BPO_4$ | $BPO_4$ | $BPO_4$ |
| Volume (ml.) | 99 | 99 | 99 | 100 | 100 |
| Weight (gms.) | 76 | 77 | 76 | 74 | 83 |
| Prep'n | (1) | (1) | (1) | (1) | |
| Size (mesh) | 4–14 | 4–14 | 4–14 | 4–14 | 4–14 |
| Polymer (gms.) | 53.9 | 78.3 | 74.1 | 70.7 | 55.0 |
| A. P. I. (60° F.) | 51.8 | 54.5 | 58.9 | 57.5 | 57.8 |
| Distillation— | | | | | |
| I. B. P., °F | 108 | 105 | 98 | 151 | 114 |
| 400° F., E. P. (percent) | 56 | 69 | 84 | 75 | 85 |
| Density/20° C | 0.750 | 0.743 | 0.734 | 0.746 | 0.746 |
| Bromine No | 104.7 | 104.6 | 112.5 | 117.7 | 123.8 |
| Over 400° F. (percent) | 39 | 26 | 10 | 18 | 8 |
| Density/20° C | 0.812 | 0.823 | 0.840 | 0.810 | 0.820 |
| Bromine No | 68.7 | 79.2 | 65.9 | 83.7 | 75.6 |
| Conversion to Polymer | 55.0 | 82.5 | 74.9 | 67.3 | 49.5 |

1 Calcined.

I claim:
1. A method of polymerizing aliphatic mono-olefins containing from 3 to 10 carbon atoms, which comprises contacting said mono-olefin with a boron phosphate catalyst at a temperature between 150° F. and 600° F. at a space velocity between 0.5 and 3 volumes of mono-olefin per volume of catalyst per hour, and recovering the resulting olefin polymers.

2. A method of polymerizing aliphatic mono-olefins containing from 3 to 10 carbon atoms, which comprises contacting said mono-olefin with a boron phosphate catalyst at a temperature between 150° F. and 600° F. under a pressure between 0 and 1000 pounds per square inch gage and at a space velocity between 0.5 and 3 volumes of mono-olefin per volume of catalyst per hour, and recovering the resulting olefin polymers.

3. A method of polymerizing propylene, which comprises contacting propylene with a boron phosphate catalyst at a temperature between 300° F. and 600° F. at a space velocity between 0.5 and 3 volumes of propylene per volume of catalyst per hour, and recovering the resulting propylene polymers.

4. A method of polymerizing propylene, which comprises contacting propylene with a boron phosphate catalyst at a temperature between 300° F. and 600° F. under a pressure between 300 and 700 pounds per square inch gage and at a space velocity between 0.5 and 3 volumes of propylene per volume of catalyst per hour, and recovering the resulting propylene polymers.

5. A method of polymerizing propylene, which comprises contacting propylene with a boron phosphate catalyst at a temperature of about 400° F. under a pressure of about 650 pounds per square inch gage, and at a space velocity of about 1 volume of propylene per volume of catalyst per hour, and recovering the resulting propylene polymers.

6. A method of polymerizing isobutylene, which comprises contacting isobutylene with a boron phosphate catalyst at a temperature between 150° F. and 400° F. at a space velocity between 0.5 and 3 volumes of isobutylene per volume of catalyst per hour, and recovering the resulting isobutylene polymers.

7. A method of polymerizing isobutylene, which comprises contacting isobutylene with a boron phosphate catalyst at a temperature between 150° F. and 400° F. under a pressure between 0 and 1000 pounds per square inch gage and at a space velocity between 0.5 and 3 volumes of isobutylene per volume of catalyst per hour, and recovering the resulting isobutylene polymers.

8. A method of polymerizing isobutylene, which comprises contacting isobutylene with a boron phosphate catalyst at a temperature of about 300° F. under a pressure of about 200 pounds per square inch gage and at a space velocity of about 1 volume of isobutylene per volume of catalyst per hour, and recovering the resulting isobutylene polymers.

9. A method of polymerizing aliphatic mono-olefins containing from 3 to 10 carbon atoms, which comprises contacting said mono-olefin with a boron phosphate catalyst at a temperature between 150° F. and 600° F. at a space velocity between 0.5 and 3 volumes of mono-olefin per volume of catalyst per hour, and recovering the resulting olefin polymer, said catalyst being prepared by heating substantially chemically equivalent amounts of phosphoric acid and boric acid at 100° C. to 150° C. for a time sufficient to produce $BPO_4$.

ROBERT C. KRUG.

REFERENCES CITED

The following references are of record in the file of this patent:

UNITED STATES PATENTS

| Number | Name | Date |
|---|---|---|
| 2,173,482 | Keunecke et al. | Sept. 19, 1939 |
| 2,486,533 | Mayland et al. | Nov. 1, 1949 |
| 2,559,576 | Johnstone | July 3, 1951 |

FOREIGN PATENTS

| Number | Country | Date |
|---|---|---|
| 340,513 | Great Britain | Dec. 22, 1930 |

OTHER REFERENCES

Latimer et al., "Reference Book of Inorganic Chemistry," pp. 219–220 (1940).